United States Patent
Berthet

(10) Patent No.: US 10,120,696 B2
(45) Date of Patent: Nov. 6, 2018

(54) METHOD AND DEVICE FOR CONTROLLING USABILITY OF A COMMUNICATION DEVICE

(71) Applicant: Sony Mobile Communications Inc., Tokyo (JP)

(72) Inventor: David Berthet, Åkarp (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 37 days.

(21) Appl. No.: 14/662,596

(22) Filed: Mar. 19, 2015

(65) Prior Publication Data

US 2016/0274920 A1 Sep. 22, 2016

(51) Int. Cl.

| | | |
|---|---|---|
| G06F 9/44 | (2018.01) | |
| G06F 9/4401 | (2018.01) | |
| G06F 21/88 | (2013.01) | |
| H04W 12/12 | (2009.01) | |
| G06F 21/30 | (2013.01) | |

(Continued)

(52) U.S. Cl.

CPC .......... *G06F 9/4408* (2013.01); *G06F 9/4416* (2013.01); *G06F 21/305* (2013.01); *G06F 21/575* (2013.01); *G06F 21/88* (2013.01); *H04W 12/12* (2013.01); *G06F 2221/2105* (2013.01); *G06F 2221/2147* (2013.01); *H04L 63/123* (2013.01)

(58) Field of Classification Search

CPC ....... G06F 9/4416; G06F 21/88; H04W 12/12

See application file for complete search history.

(56) References Cited

U.S. PATENT DOCUMENTS 6,151,678 A * 11/2000 Davis .................... G06F 21/305
                                                              714/36
6,813,487 B1 * 11/2004 Trommelen .......... H04W 88/02
                                                              340/568.1

(Continued)

FOREIGN PATENT DOCUMENTS

| GB | 2445778 A | 7/2008 |
|---|---|---|
| WO | 2012085593 A1 | 6/2012 |

(Continued)

OTHER PUBLICATIONS

International Search Report and Written Opinion from counterpart International Patent Application No. PCT/EP2015/071490, dated Dec. 23, 2015.

(Continued)

*Primary Examiner* — Gary Collins

(74) *Attorney, Agent, or Firm* — Tucker Ellis LLP

(57) ABSTRACT

A method and a device for controlling usability of a communication device having a processing unit including a memory for storing computer code, a modem, an access circuit connected to the modem for cellular network authentication and access, and a secure element connected to the access circuit. A boot of the processing unit and the secure element can be initiated at power up of the device. A boot service in the secure element can be executed, and a current state of a state machine in the secure element can be determined. Thereafter, a partition of an operating system can be booted, where the partition is selected dependent on said current state of the state machine.

17 Claims, 2 Drawing Sheets

(51) Int. Cl.
*G06F 21/57* (2013.01)
*H04L 29/06* (2006.01)

(56) References Cited

U.S. PATENT DOCUMENTS

| | | | |
|---|---|---|---|
| 7,873,382 B2 | 1/2011 | Rydgren et al. | |
| 7,975,034 B1* | 7/2011 | Chandra | G06F 21/575 709/220 |
| 8,225,110 B2 | 7/2012 | Stahl | |
| 8,509,737 B2 | 8/2013 | Cantini et al. | |
| 8,744,403 B2 | 6/2014 | Wu et al. | |
| 8,745,730 B1* | 6/2014 | Worsley | G06F 21/88 380/247 |
| 8,812,837 B2 | 8/2014 | McCanna et al. | |
| 8,819,330 B1* | 8/2014 | Spangler | G06F 11/00 711/103 |
| 9,158,920 B2* | 10/2015 | Zimmer | G06F 21/575 |
| 9,218,508 B2* | 12/2015 | Wang | G06F 21/78 |
| 2004/0210796 A1* | 10/2004 | Largman | G06F 11/1417 714/20 |
| 2005/0186954 A1* | 8/2005 | Kenney | H04M 1/67 455/420 |
| 2006/0031541 A1* | 2/2006 | Koch | H04W 8/08 709/229 |
| 2006/0155988 A1* | 7/2006 | Hunter | G06F 21/575 713/164 |
| 2006/0212691 A1* | 9/2006 | Wood | G06F 9/441 713/1 |
| 2007/0101135 A1* | 5/2007 | Saba | G06F 21/88 713/168 |
| 2008/0162914 A1* | 7/2008 | Adrangi | G06F 9/441 713/2 |
| 2009/0089569 A1* | 4/2009 | Baribault | G06F 15/16 713/2 |
| 2010/0005313 A1* | 1/2010 | Dai | H04L 63/0853 713/185 |
| 2011/0087872 A1* | 4/2011 | Shah | G06F 21/74 713/2 |
| 2011/0312383 A1* | 12/2011 | Youn | G06F 9/441 455/558 |
| 2012/0064945 A1* | 3/2012 | Kim | G06F 9/441 455/558 |
| 2012/0066546 A1* | 3/2012 | Kim | G06F 11/1417 714/15 |
| 2012/0124354 A1* | 5/2012 | Batwara | G06F 1/3203 713/2 |
| 2012/0185933 A1* | 7/2012 | Belk | G06F 21/88 726/17 |
| 2012/0233685 A1* | 9/2012 | Palanigounder | H04W 12/06 726/9 |
| 2012/0260095 A1* | 10/2012 | Von Hauck | H04L 9/3228 713/176 |
| 2013/0124840 A1* | 5/2013 | Diluoffo | G06F 21/575 713/2 |
| 2014/0020122 A1 | 1/2014 | Berger | |
| 2014/0173268 A1* | 6/2014 | Hashimoto | G06F 11/0754 713/2 |
| 2014/0372743 A1* | 12/2014 | Rogers | H04L 9/3234 713/2 |
| 2015/0074764 A1* | 3/2015 | Stern | H04L 63/06 726/4 |
| 2015/0143096 A1* | 5/2015 | Berthier | G06K 19/07309 713/2 |
| 2016/0179554 A1* | 6/2016 | Khosravi | G06F 9/4406 726/1 |
| 2016/0253529 A1* | 9/2016 | Griffes | G06F 21/88 711/166 |

FOREIGN PATENT DOCUMENTS

| | | |
|---|---|---|
| WO | 2013/095594 A1 | 6/2013 |
| WO | 2014/037053 A1 | 3/2014 |
| WO | 2014092385 A | 6/2014 |

OTHER PUBLICATIONS

"TCG MPWG Mobile Reference Architecture. Specification version 1.0 Revision 1", TCG, Jun. 12, 2007, pp. 1-87.
USPTO: Non-Final Office Action dated Mar. 21, 2016, issued in corresponding U.S. Appl. No. 14/662,611.
Pending Claims in corresponding U.S. Appl. No. 14/662,611, filed Mar. 19, 2015.
International Search Report and Written Opinion from counterpart International Patent Application No. PCT/EP2015/071475, dated Dec. 22, 2015.
TCG MPWG Mobile Reference Architecture, Specification version 1.0 Revision 111. TCG, Jun. 12, 2007, pp. 1-87.
Eimear Gallery et al: "Trusted Mobile Platforms", Aug. 18, 2007, Foundations of Security Analysis and Design IV, pp. 282-323.
Trusted Computing Group et al: "TCG Specification Architecture Overview passage", TCG Specification Architecture Overview, Trusted Computing Group, US, no. revision 1.2, Apr. 28, 2004.

* cited by examiner

METHOD AND DEVICE FOR CONTROLLING USABILITY OF A COMMUNICATION DEVICE

FIELD OF INVENTION

The present invention relates to a method for integrated boot service for controlling the usability of a device, and particularly for remotely controlling such a device, and to such a device configured to operate an integrated boot service. More specifically, the boot service may be connected to impede full operation of a processor of such a device.

BACKGROUND

An old problem related to any type of device of value, is the risk of losing the device by accident or by theft. It must often be acknowledged that a lost or stolen device will probably not be returned to its rightful owner as long as the device is fully usable and the identity of the owner is unknown. For articles of manufacture, which are configured to be communicatively connected to a network, such as computers and mobile phones, various suggestions have been made regarding means for overcoming this problem. Most existing protection and tracking solutions are built in as a preventive action that needs to be activated by the user in order to protect the device. Existing password based solutions will protect a device to some extent but can be overcome. Existing tracking solutions using accounts and connectivity are dependent on a lot of prerequisites in order to be operational and effective. Other prior solutions include the following disclosures.

U.S. Pat. No. 8,509,737 describes a security module configured to authenticate a telecommunications network. The security module comprises a locking module for disabling usability of an application module, an unlocking module for re-enabling usability of the application module, and a control module for activating the unlocking module depending on received data that is assignable in an authenticated way to a specific telecommunications network.

U.S. Pat. No. 8,812,837 relates to a method that incorporates storing, by a universal integrated circuit card (UICC) including at least one processor, a digital root certificate locking a communication device to a network provider, and disabling an activation of the communication device responsive to receiving an indication of a revocation of the stored digital root certificate from a certificate authority.

WO2012085593 discloses a smartcard embedded or inaccessible within a cellular telecommunications device, locked to a particular operator, while allowing the operator to be altered legitimately presents a challenge. A method is described using policy control tables, and by maintaining the policy control table, any operator subscription may be downloaded/activated on the smartcard but the device will be prevented from accessing the desired operator because that access would violate the lock rules.

GB2445778 shows a mobile communication device comprises a memory for storing a unique identifier of the device and a processor for determining the lock status of the device-If the processor determines that the device is unlocked, the device transmits to a server an authorization request to operate in the unlocked mode including the unique identifier of the device. The server compares the unique identifier to unique identifiers of devices stored in a database, each identifier associated with a lock status. The device receives from the server the lock status of the device and controls the operation of the device in dependence upon the determined lock status U.S. Pat. No. 8,744,403 provides a method and system for remote control of a smart card. The method comprises that: a smart card management platform receives a request of locking or unlocking a smart card from a subscriber and the smart card management platform performs interactive processing with a terminal side according to the request via a mobile network platform, so as to enable the terminal side to perform the locking or unlocking of the smart card.

WO2014092385 discloses a method for selecting a specific provisioning profile from among a plurality of provisioning profiles and an apparatus using same. In a terminal to which an embedded UICC is mounted, which includes at least one provisioning profile wherein each of the one or more provisioning profile enables a user terminal to communicate with a subscriber management entity supporting at least one network provider. Accordingly, a specific provisioning profile can be selected from among the one or more provisioning profiles, and a network can be connected with a specific mobile communication provider using the selected provisioning profile.

U.S. Pat. No. 7,873,382 describes a mobile communication apparatus that includes a remote lock and control function. After theft or loss of the apparatus, it is possible to remotely lock the apparatus by sending a lock command, e.g. an SMS message. The apparatus may also be controlled to upload information enabling the user to retrieve valuable information stored in the apparatus. The apparatus includes a control unit and registers for controlling the operations of the apparatus, including receiving messages. The apparatus further includes locking means capable of detecting codes in messages received and, responsive to detecting a lock code, sending a lock command to the control unit to render the mobile communication apparatus at least partially inoperable.

SUMMARY OF THE INVENTION

The prior art has thus offered different solutions for protecting mobile terminals, configured to operate in a mobile communications network. However, many devices that are not communication terminals as such may indeed also be susceptible to misplacement or theft. The invention targets the general object of being able to control devices of value, which may include minimizing the risk of losing possession or control of such a device.

According to a first aspect, this is targeted by a method for controlling usability of a communication device comprising a processing unit including a memory for storing computer code, a modem, an access circuit connected to the modem for cellular network authentication and access, and a secure element connected to the access circuit, comprising the steps of initiating boot of the processing unit at power up of the device; executing a boot service in the secure element; determining a current state of a state machine in the secure element; and booting a partition of an operating system, which partition is selected dependent on said current state.

In one embodiment, the step of executing a boot service is carried out in response to a request in boot code of the processing unit.

In one embodiment, further boot of the processing unit is suspended while executing the boot service in the secure element.

In one embodiment, boot of a primary operating system partition is carried out in response to the current state being a normal state.

In one embodiment, boot of a secondary operating system partition is carried out in response to the current state being an alert state.

In one embodiment, the method comprises the step of booting the modem from a file system comprising the boot code, after the step of booting a partition of the operating system, so as to connect to the cellular network to initiate online state control.

In one embodiment, the method comprises the step of booting the modem from a stand-alone memory before or parallel to booting a partition of an operating system.

In one embodiment, the method comprises the step of powering down the device responsive to the current state being an alert state, and the modem not being able to connect to the cellular network.

In one embodiment, the method comprises the step of initiating tracking of the device by means of a positioning unit in the device, and transmitting position data to the network, responsive to the current state being an alert state.

In one embodiment, the method comprises the steps of, responsive to a state change request event, updating the state of the state machine; and restarting the device.

In one embodiment, said state change request event is self-triggered dependent on time and/or position, or according to a default startup rule.

In one embodiment, said state change request event comprises receipt of a signal from the network, representing an instruction to set the state machine to an alert state.

In accordance with a second aspect the object is targeted by a communication device comprising a processing unit including a memory for storing computer code including boot code, a modem, an access circuit connected to the modem for cellular network authentication and access, and a secure element connected to the access circuit, wherein the processing unit is configured to initiate boot at power up of the device and to execute a boot service in the secure element, wherein the secure element realizes a state machine having a current state, and wherein the processing unit is configured to boot a partition of an operating system, which partition is selected dependent on said current state.

In one embodiment, the boot code for the processing unit comprises instructions to jump to execute the boot service in the secure element, and to suspend further boot of the processing unit while executing the boot service in the secure element.

In one embodiment, the boot code comprises instructions to boot a primary operating system partition in response to the current state being a normal state, and instructions to boot a secondary operating system partition in response to the current state being an alert state.

In one embodiment, the boot code comprises instructions to boot the modem from a file system after booting a partition of an operating system.

In one embodiment, the boot code comprises instructions to boot the modem from a file system after booting a partition of an operating system.

In one embodiment, the boot code comprises instructions to power down the device responsive to the current state being an alert state, and the modem not being able to connect to the cellular network.

In one embodiment, the modem is configured to connect to the cellular network to initiate online state control.

In one embodiment, the processing unit is configured to update the state of the state machine and to restart the device, responsive to a state change request event, wherein said state change request event is self-triggered and dependent on time and/or position, or receipt of a signal from the network, representing an instruction to set the state machine to an alert state.

In one embodiment, the access circuit and the secure element form part of an eUICC.

BRIEF DESCRIPTION OF THE DRAWINGS

Various embodiments of the invention will be described below with reference to the accompanying drawings, in which.

DETAILED DESCRIPTION OF PREFERRED EMBODIMENTS

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 1:
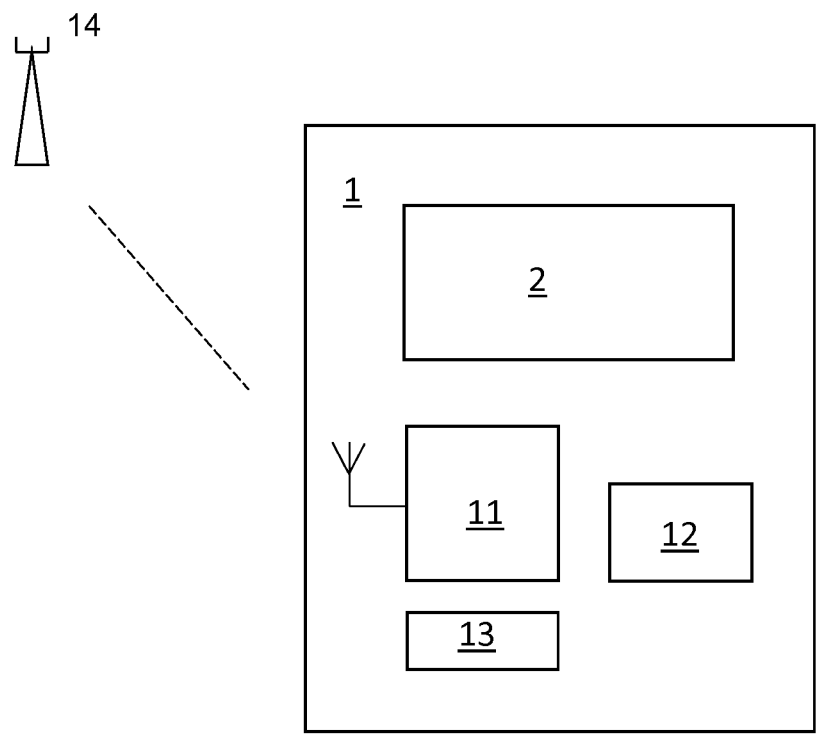
FIG. 1 illustrates a device configured for integrated usability control according to one embodiment.

FIG. 1 schematically illustrates an embodiment of a communication device 1 comprising a processing unit 2 such as a central processing unit (CPU), which device 1 is configured for integrated usability control. The communication device 1 may e.g. take the form of a mobile phone, a portable computer, a surf board or similar. In addition, the device 1 may be any type of apparatus for which communication is not its primary purpose. As an example, a vehicle may primarily be used for transportation, but may well include a communication means for exchanging data with or downloading updates from a cellular network 14, indicated in FIG. 1 by means of a base station. The device 1 thus comprises a modem 11 for communicating with a cellular network 14, and an access circuit 12 connected to the modem 11 for cellular network authentication and access. The modem 11 may include or be connected to an antenna, for radio transmission with the cellular network 14. The access circuit 12 comprises or is connected to a secure element, and the secure element incorporates a state machine, effected by executable computer code. In the embodiment of FIG. 1, the secure element and the access circuit for part of a common unit, and both are therefore commonly denoted 12 herein for the sake of simplicity. The state machine may be configured to control the device 1 in accordance with one of a plurality of usability states, including at least two states. Those states include at least a normal state, which may mean a state in which normal operation of the processing unit 2 of the device 1 is allowed or supported. In addition, the plurality of states include an alert state, in which operation of the processing unit 2 is inhibited. The device 1 may also comprise a positioning unit 13, as will be explained. In order to be able to control usability of the device 1, a boot service is executed by the secure element upon startup of the device, which queries the state machine.

In one embodiment, the secure element includes a circuit which is non-detachably connected to the processing unit 2. The secure element circuit 12 may be soldered to a common circuit board at the processing unit 2. In an alternative arrangement, the secure element circuit 12 may be provided on a circuit card, which is non-detachably secured in a card reader, which card reader is mechanically connected to the processing unit 2.

In a preferred embodiment that will be outlined herein, the access circuit forms part of an embedded Universal Integrated Circuit Card (eUICC) 12. Also the secure element preferably forms part of the eUICC 12. In this respect, it may be noted that one and the same type of hardware circuit may e.g. be flashed to act as an UICC, or simply as an eSE, which may be decided by choice of implementation. In an alternative arrangement, a separate embedded secure element (eSE) may be employed, which has a secure element circuit that is separate from the eUICC. In another embodiment, in which such a separate eSE provides the secure element circuit, may be combined with a standard detachable Subscriber Identity Module (SIM) card, which provides the access circuit.

The embedded UICC 12 is preferably compliant with a standard for provisioning over-the-air, and holds at least a security domain with cellular network access capabilities. The embedded UICC 12 holds a security domain, alternatively referred to as a root security domain, which includes the necessary applications and the registers to manage and maintain the state of the device 1 in terms of usability, in other words a state machine. The range of states allowed is defined upon the choice of implementation. As a strict minimum, an alert and a normal state need to be defined. When the state machine of the eUICC is set in alert state the device 1 is not operable unless an alert is resolved and the device 1 goes back to the normal operation as under normal state, as defined by the implementation. The exact definition of operability may be defined through the choice of implementation, but an alert state shall mean that the device 1 cannot be used as intended and that the necessary measures have been implemented to avoid unauthorized change of state. Network access and authentication code on the one hand, and code for the state machine on the other hand, may be held in one single domain, or alternatively in separate domains of the secure element, e.g. on an eUICC.

Figure 2:
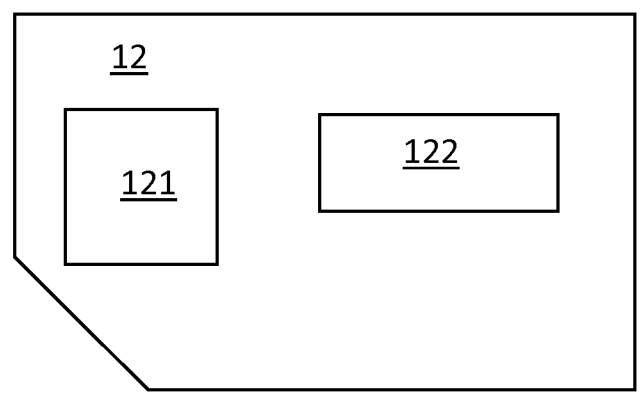
FIG. 2 schematically illustrates an access circuit and a secure element, formed on a common carrier according to one embodiment.

FIG. 2 schematically illustrates a combined access circuit and secure element in the form of a UICC 12. This UICC may e.g. be an eUICC, or e.g. a UICC that in other ways has been non-detachably connected to the modem 11, and in turn to the processing unit 2 of a device 1 under control. The eUICC 12 comprises circuits and memory means configured to store program code forming eUICC operating software (OS) 121. The eUICC OS 121 is configured to implement alert management, integrated with domain management of the eUICC. For this purpose, the eUICC 12 comprises a root security domain 122. The embedded UICC shall not allow the root security domain 122 to be deleted but other security domains can be installed and activated in case the device integrates cellular connectivity in its primary definition, meaning that the device itself already includes a modem. In case of alert, the eUICC OS 121 must secure that the alert event is provided to the root security domain responsible for state control.

In accordance with a preferred embodiment, once an authenticated alert is received by the embedded UICC 12, the root security domain 122 will perceive the alert in order to perform usability control of the device 1. More specifically, means are implemented for restarting or powering down the device 1, such as by means of hardware circuitry or as software code which may be executed by e.g. the eUICC 12, as will be further described below.

The device 1 is remotely accessible over the cellular network 14 and the state of the eUICC 12 is remotely controllable by an authenticated remote service. The authenticated remote service shall be allowed to query the state of the eUICC 12 and request a change of state. However, at startup the device 1 is configured to handle usability control before any network connection can be obtained. In accordance with a preferred embodiment, when the device 1 is switched on, boot code of the processing unit 2 requests execution of a boot service residing in the secure element, such as in the eUICC 12. The boot service will determine the current state, as set in a state machine residing in the secure element of the device 1, and will dependent on the state determine which boot partition will be used for system boot of the device 1. It may be recommended to realize a standardized implementation such as UEFI (Unified Extensible Firmware Interface) for the boot service within the security domain 122. A primary OS boot partition sets the device 1 in normal operating conditions, while the secondary OS boot partition provides a restricted mode, allowing the modem 11 to boot so as to enable online state control and tracking Software update of the device 1 is preferably managed by the secondary OS boot partition. Dependent on choice of implementation, the device 1 may be configured to perform tracking to send its position to the network 14 and simply switch off, or it may enter a low power tracking mode to constantly report state and position to an authenticated remote service. In such an embodiment, the device 1 may include a positioning unit 13, e.g. a GPS receiver. Obtained position information, and potentially other information related to the device may, upon agreement, be forwarded to an authenticated owner or authorities.

Alerts can be triggered both from an authenticated service on the device itself or be broadcast from an authenticated remote service over the cellular network 14 but can preferably only be resolved remotely. This allows the implementation of self-request mechanisms where the device itself requests a change of state. An example of such an embodiment may be when a device 1 is configured to switch to alert state after a certain time, or upon leaving or entering a certain area, etc.

Figure 3:
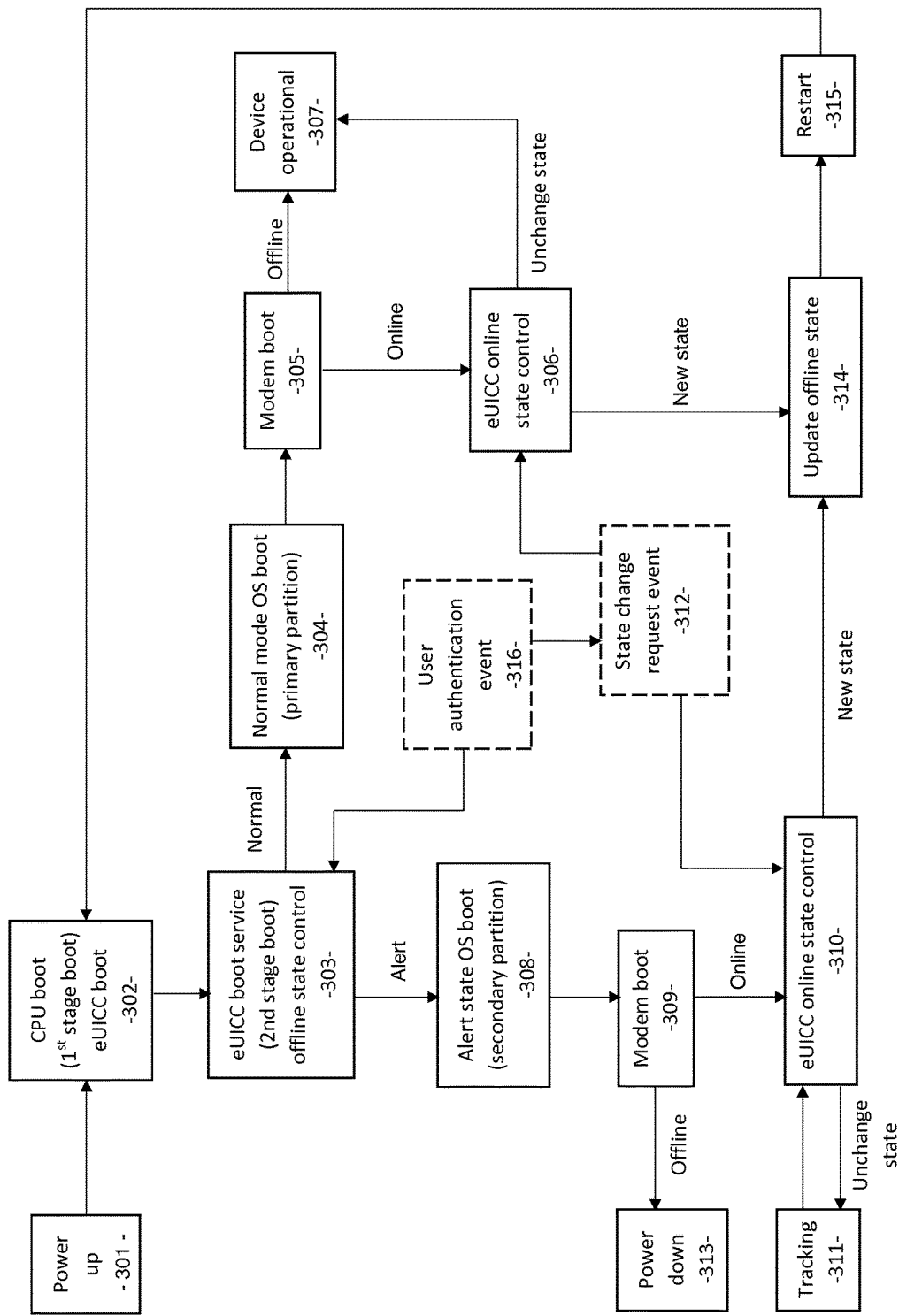
FIG. 3 schematically illustrate a flow chart for a process for operating the embodiment of FIGS. 1 and 2 according to one embodiment.

FIG. 3 schematically shows a flow diagram representing an embodiment for controlling usability of a communication device 1 comprising a processing unit 2 including a memory for storing computer code, a modem 11, an access circuit 12 connected to the modem for cellular network authentication and access, and a secure element connected to the access circuit, e.g. provided on an eUICC 12. The processing unit 2 is denoted CPU (Central Processing Unit) in the drawing for the sake of simplicity. The flow diagram of FIG. 3 includes both processes at startup, and processes during operation of the device 1 for monitoring and acting on state change request events.

Power up 301 is typically initiated by a user, e.g. by pushing a button, turning a key or similar on the device 1 in question. Upon power up, boot of the processing unit 2 and of the secure element 12 is initiated in step 302. However, this is preferably only a 1$^{st}$ stage boot of the processing unit 2.

In step 303 a boot service is executed in the secure element 12. This boot service acts as a function for controlling further boot of the processing unit 2, and further boot of the processing unit 2 is preferably suspended while executing the boot service in the secure element 12. At this stage, a state machine realized in the secure element 12 is queried, for determining a current state. The current state of the state machine may also be referred to as an offline state, which may be a preset state which is always used at startup, or e.g. a state stored since a last time the device was powered. The state machine may take one of a plurality of states, including at least a normal state and an alert state. Dependent on the current state, further boot of an operating system (OS) 121 for the processing unit 2 is continued.

If the current state is normal state, boot of a primary OS partition is carried out in step 304. This may represent full, normal, function for the processing unit 2. Thereafter, the modem may be booted in step 305. If the modem is capable of going online and connect to a cellular network 14, an online state control will be carried out at step 306, so as to monitor a potential cellular state change request 312. As long as no such request is received, or if the modem is not capable of going online, the normal state is considered active, and the device thereby fully operational in step 307. The booting in step 306 may be relevant at least for an embodiment in which firmware for modem boot forms part of the same file system as the processor unit boot code. In an alternative embodiment, in which the modem 11 is a stand-alone unit with separate boot code, the booting and also the attempt to go online and connect to a cellular network 14, may be carried out earlier, prior or parallel to OS boot.

If the current state as queried in step 303 instead is alert, boot of a secondary operating system partition is carried out in step 308. In the alert state, the device 1 is restricted from becoming fully functional. In a preferred embodiment, the second partition of the OS only allows for starting up the modem and performing online state control, and potentially for allowing tracking, as will be described.

In step 309 the modem is booted. If the modem is capable of going online and connect to a cellular network 14, an online state control will be carried out at step 310, so as to monitor a potential cellular state change request 312. If the modem was capable of going online, i.e. connecting to a cellular network 14, and no state change to normal state is received, the device 1 may be configured to go into a tracking mode in step 311, to thereby initiating tracking of the device 1 by means of a positioning unit 13 in the device 1, and transmitting position data to the network 14. Dependent on setting, this may be performed continuously, or intermittently, or possibly only when a certain magnitude of change of position has been detected by the positioning unit 13. The arrow back to step 310 indicates that the device 1 may still be configured to perform online state control, should a state change request event 312 occur.

If the modem is not capable of going online in step 309, the device 1 may be configured to power down in step 313. This could e.g. happen if a stolen device 1 is covered by a radio deflecting material, such as aluminum foil.

When a device 1 is in online state control 306 (or 310), the device is susceptible to receive state instructions from the cellular network 14. This is usable for transforming a device from normal state to alert state remotely, e.g. in case of theft or unauthorized use. It may likewise be used for "opening" a locked device set in alert state, by sending a request for normal state in step 310. Responsive to a state change request event, the device is configured to update the state of the state machine in step 314, and thereafter to restart the device 12 in step 315. The process may then return to 1$^{st}$ stage boot of the processing unit 2 in step 302. The steps of locking a device (i.e. setting the state to alert) or unlocking (setting a normal state) during online state control 306, 310 is triggered by a state change request event 312. As mentioned, this may be the sending of a signal through the network 14 for reception by the modem 11. Alternatively, the state change request event may be self-triggered. It may e.g. be dependent on time, such as a self-lock timer or even be the default state at power up. Alternatively, or in combination, position of the device, as determined by positioning unit 13, may act as a trigger for the device 1 to go to alert mode. Alternatively, or in combination, the device could be set in alert when manufactured and remotely unlocked when sold.

Changing state may require a step of user authentication 316. In order to be able to change state of a device 1 which is offline, the device may be configured to allow offline user authentication as well. More specifically, in case the device 1 is set in alert state offline, it shall preferably be possible to change the offline state after proper user authentication 316. This may e.g. be done wirelessly, e.g. by NFC if an NFC receiver is contained in the device 1 (not shown), through galvanic contact with a bus, or by input on a user interface, such as a touch screen.

Embodiments of the invention have been discussed in the foregoing on a general level, and with respect to certain embodiments. The skilled person will realize that, where they are not contradictory, the disclosed embodiments above may be combined in various combinations.

The invention claimed is:

1. A method, carried out by a communication device, for controlling usability of the communication device, comprising:

initiating, at power-up of the communication device, a boot of an embedded Universal Integrated Circuit Card (eUICC) in the communication device, wherein the eUICC comprises circuits and memory for storing and executing operating software, a root security domain including executable applications and registers that manage and maintain a state of the communication device, and a boot service that determines the maintained state of the communication device, and wherein the eUICC further includes an access circuit connected to a modem, and wherein the eUICC is connected to the access circuit for cellular authentication and access;

initiating, at power-up of the communication device, a boot of a processing unit of the communication device;

executing the boot service in a secure element in response to an instruction in a boot code of the processing unit;

suspending the initiated boot of the processing unit while executing the boot service in the secure element;

determining, by the boot service in the secure element, the state of the communication device maintained in the eUICC; and booting a partition of either a primary operating system or a secondary operating system, wherein the primary or secondary operating system partition is booted dependent on the state of the communication device maintained in the eUICC.

2. The method of claim 1, wherein boot of the primary operating system partition is carried out in response to the state of the communication device maintained in the eUICC being a normal state.

3. The method of claim 1, wherein boot of the secondary operating system partition is carried out in response to the state of the communication device maintained in the eUICC being an alert state.

4. The method of claim 1, comprising the step of:
booting the modem from a file system comprising the boot code, after the step of booting either the primary or secondary operating system partition; and
attempting to connect, via the modem, to the cellular network to initiate online state control of the state of the communication device maintained in the eUICC.

5. The method of claim 4, comprising the step of:
powering down the device responsive to the state of the communication device maintained in the eUICC being an alert state, and the modem not being able to connect to the cellular network.

6. The method of claim 4, comprising the step of:
initiating tracking of the device by means of a positioning unit in the device, and transmitting position data to the network, responsive to the state of the communication device maintained in the eUICC being an alert state.

7. The method of claim 4, comprising the steps of:
updating the state of the communication device maintained in the eUICC via online state control; and
restarting the device after the updating.

8. The method of claim 7, wherein said updating is self-triggered dependent on one of time, position, or according to a default startup rule.

9. The method of claim 7, wherein said updating comprises receipt of a signal from the cellular network representing an instruction to set the state of the communication device maintained in the eUICC to an alert state.

10. The method of claim 1, comprising the steps of:
booting the modem from a stand-alone memory before or parallel to booting the primary or secondary operating system partition.

11. A communication device comprising:
a modem;
an embedded Universal Integrated Circuit Card (eUICC) comprising circuits and memory for storing and executing operating software, a root security domain including executable applications and registers that manage and maintain a state of the communication device, and a boot service that determines the maintained state of the communication device, wherein the eUICC further includes an access circuit connected to the modem, and wherein the eUICC is connected to the access circuit for cellular authentication and access;
a processing unit including a memory for storing computer code including boot code; and
wherein the communication device is configured to:
initiate a boot of the processing unit and the eUICC at power up of the device, including executing the boot code of the processing unit;
execute the boot service in a secure element in response to an instruction in the boot code of the processing unit;
suspend the initiated boot of the processing unit while executing the boot service in the secure element;
determining, by the boot service in the secure element, the state of the communication device maintained in the eUICC;
and
boot a partition of either a primary operating system or a secondary operating system, wherein the primary or secondary operating system partition is booted dependent on the state of the communication device maintained in the eUICC.

12. The communication device of claim 11, wherein the boot code comprises instructions to boot the primary operating system partition in response to the state of the communication device maintained in the eUICC being a normal state, and instructions to boot a secondary operating system partition in response to the state of the communication device maintained in the eUICC being an alert state.

13. The communication device of claim 11, wherein the boot code comprises instructions to boot the modem from a file system after booting either the primary or secondary operating system partition.

14. The communication device of claim 11, wherein the boot code comprises instructions to boot the modem from a stand-alone memory before or parallel to booting the primary or secondary operating system partition.

15. The communication device of claim 11, wherein the boot code comprises instructions to power down the device responsive to the state of the communication device maintained in the eUICC being an alert state, and the modem not being able to connect to the cellular network.

16. The communication device of claim 11, wherein the modem is configured to connect to the cellular network to initiate online state control.

17. The communication device of claim 11, wherein the processing unit is configured to update the state of the communication device maintained in the eUICC via online state control and to restart the device, responsive to the update, wherein said update is self-triggered and dependent on one of time, position, or receipt of a signal from the network, representing an instruction to set the state of the communication device maintained in the eUICC to an alert state.

* * * * *